(12) United States Patent
Uchino et al.

(10) Patent No.: US 10,306,699 B2
(45) Date of Patent: May 28, 2019

(54) USER EQUIPMENT AND BASE STATION

(71) Applicant: NTT DOCOMO, INC., Tokyo (JP)

(72) Inventors: Tooru Uchino, Tokyo (JP); Hideaki Takahashi, Tokyo (JP); Wuri Andarmawanti Hapsari, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 15/116,855

(22) PCT Filed: Aug. 5, 2015

(86) PCT No.: PCT/JP2015/072282
§ 371 (c)(1),
(2) Date: Aug. 5, 2016

(87) PCT Pub. No.: WO2016/021662
PCT Pub. Date: Feb. 11, 2016

(65) Prior Publication Data
US 2017/0171905 A1    Jun. 15, 2017

(30) Foreign Application Priority Data

Aug. 6, 2014    (JP) .................................. 2014-160762

(51) Int. Cl.
*H04W 76/25* (2018.01)
*H04W 16/32* (2009.01)
(Continued)

(52) U.S. Cl.
CPC ........... *H04W 76/25* (2018.02); *H04W 16/32* (2013.01); *H04W 28/10* (2013.01); *H04W 28/16* (2013.01);
(Continued)

(58) Field of Classification Search
CPC .................................................. H04W 36/04
See application file for complete search history.

(56) References Cited

U.S. PATENT DOCUMENTS

2014/0220983 A1* 8/2014 Peng ................. H04W 36/0072
455/438

2015/0326456 A1* 11/2015 Dudda .................. H04L 43/062
370/252
(Continued)

FOREIGN PATENT DOCUMENTS

| CN | 103888222 A | 6/2014 |
|---|---|---|
| EP | 3121981 A1 | 1/2017 |
| WO | 2015/171053 A1 | 11/2015 |

OTHER PUBLICATIONS

ZTE; "Introduction of dual connectivity into PDCP"; 3GPP TSG-RAN WG2 #86, Tdoc R2-142005; Seoul, Korea; May 19-23, 2014 (24 pages).
(Continued)

*Primary Examiner* — Gary Mui
(74) *Attorney, Agent, or Firm* — Osha Liang LLP

(57) ABSTRACT

Techniques are disclosed for implementing efficient transmission of uplink packets when the uplink transmission direction is changed in a split bearer. One aspect of the present invention relates to user equipment, comprising: a transmission and reception unit configured to communicate with a master base station and a secondary base station simultaneously in dual connectivity; an RLC (Radio Link Control) layer processing unit configured to have an RLC layer for the master base station and an RLC layer for the secondary base station; and a PDCP (Packet Data Convergence Protocol) layer processing unit configured to have a PDCP layer transmitting and receiving data to/from the RLC layer for the master base station and the RLC layer for the secondary base station, wherein when a transmission direction of uplink data packets is changed in the split bearer configured for the master base station and the secondary base station, the RLC layer processing unit performs re-establishment on the RLC layer for the master base station and the RLC layer for the secondary base station, and the PDCP layer processing unit performs re-establishment on the PDCP layer.

14 Claims, 14 Drawing Sheets

CA UP TO Rel-10

Dual Connectivity

(51) Int. Cl.
*H04W 28/10* (2009.01)
*H04W 28/16* (2009.01)
*H04W 72/04* (2009.01)
*H04W 76/15* (2018.01)
*H04W 76/27* (2018.01)
*H04W 36/04* (2009.01)

(52) U.S. Cl.
CPC ........... *H04W 36/04* (2013.01); *H04W 72/04* (2013.01); *H04W 76/15* (2018.02); *H04W 76/27* (2018.02)

(56) References Cited

U.S. PATENT DOCUMENTS

| | | | | |
|---|---|---|---|---|
| 2016/0234847 | A1* | 8/2016 | Zhang | H04W 36/0055 |
| 2016/0255551 | A1* | 9/2016 | Susitaival | H04W 36/023 370/334 |
| 2016/0295442 | A1* | 10/2016 | Virtej | H04W 72/1284 |
| 2016/0337925 | A1* | 11/2016 | Fujishiro | H04W 16/32 |
| 2016/0338132 | A1* | 11/2016 | Uchino | H04W 28/08 |
| 2016/0352643 | A1* | 12/2016 | Xiao | H04L 47/28 |
| 2017/0019821 | A1* | 1/2017 | Zhang | H04W 36/0055 |
| 2017/0142770 | A1 | 5/2017 | Fu et al. | |

OTHER PUBLICATIONS

Samsung; "Introduction of Dual Connectivity"; 3GPP TSG-RAN2 Meeting #86, R2-142461; Seoul, South Korea; May 19-23, 2014 (54 pages).
International Search Report issued in PCT/JP2015/072282 dated Oct. 13, 2015 (1 page).
Written Opinion of the International Searching Authority issued in PCT/JP2015/072282 dated Oct. 13, 2015 (3 pages).
Huawei, HiSilicon; "Throughput results for inter-frequency deployment of small cells"; 3GPP TSG-RAN WG2 Meeting #82, R2-131782; Fukuoka, Japan; May 20-24, 2013 (5 pages).
Extended European Search Report issued in the counterpart European Patent Application No. 15830364.4, dated Oct. 19, 2017 (16 pages).
Ericsson; "PDCP reordering for split bearer in dual connectivity"; 3GPP TSG-RAN WG2 #86, Tdoc R2-142400; Seoul, South Korea, May 19-23, 2014 (6 pages).
Ericsson; "Remaining issues on UL of split bearer"; 3GPP TSG-RAN WG2 #86, Tdoc R2-142415; Seoul, South Korea, May 19-23, 2014 (3 pages).
Office Action issued in counterpart European Patent Application No. 15830364.4, dated Aug. 7, 2018 (7 Pages).
NSN, Nokia Corporation; "Handover procedure in case of bearer served by MeNB and SeNB (3C)"; 3GPP TSG-RAN WG3 Meeting #82, R3-132102; San Francisco, USA, Nov. 11-15, 2013 (8 Pages).
NSN, Nokia Corporation; "Handover procedure in case of bearer only served by SeNB (1A)"; 3GPP TSG-RAN WG3 Meeting #82, R3-132101; San Francisco, USA, Nov. 11-15, 2013 (13 Pages).
Office Action issued in counterpart European Patent Application No. 15830364.4, dated Dec. 14, 2018 (6 Pages).
Office Action issued in counterpart Chinese Patent Application No. 201580008705.0, dated Nov. 27, 2018 (17 Pages).
Office Action issued in corresponding Chinese Application No. 201580008705.0, dated Mar. 14, 2019 (12 pages).

* cited by examiner

FIG.1
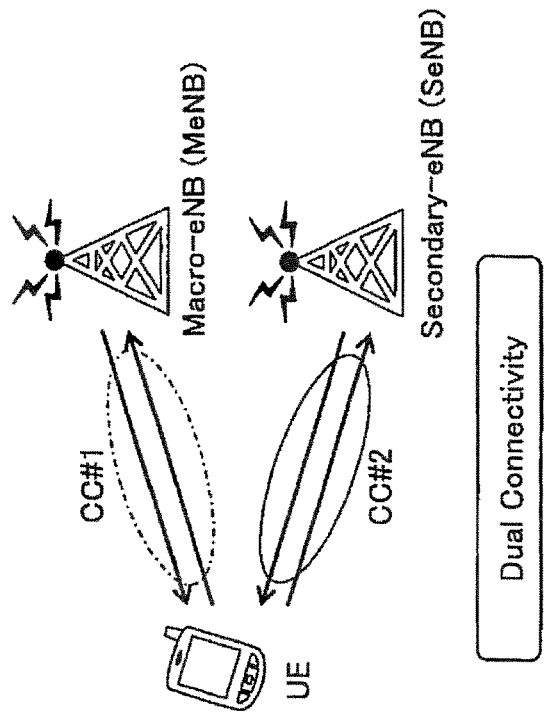
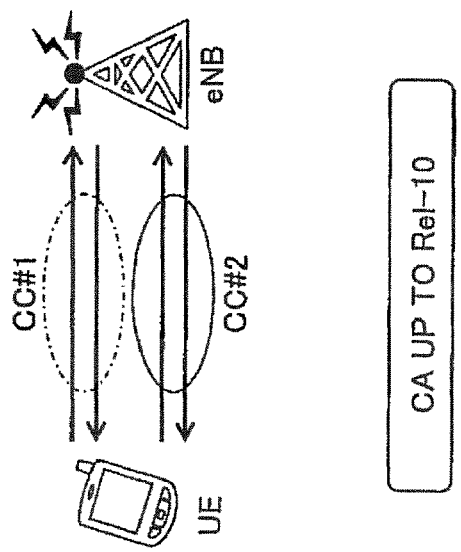

RELATED ART

USER EQUIPMENT AND BASE STATION

TECHNICAL FIELD

The present invention relates to a radio communication system.

BACKGROUND ART

Presently, as a next-generation communication standard of LTE (Long Term Evolution) systems, enhancement of LTE-Advanced is promoted. In LTE-Advanced systems, a carrier aggregation (CA) technique is introduced to achieve a higher throughput than that of LTE systems while ensuring backward compatibility with the LTE systems. In the carrier aggregation, a component carrier (CC) having the maximum bandwidth of 20 MHz supported by the LTE systems is used as a basic component, and it is designed to achieve communication in a broader band by using these multiple component carriers simultaneously.

In the carrier aggregation, user equipment (UE) can use multiple component carriers simultaneously to communicate with a base station (evolved NodeB: eNB). In the carrier aggregation, a highly reliable primary cell (PCell) to ensure connectivity to the user equipment and a secondary cell (SCell) or a secondary cell group (SCG) additionally configured for the user equipment in connection with the primary cell are configured.

The primary cell is a cell similar to a serving cell in the LTE systems and serves as a cell to ensure connectivity between the user equipment and a network. On the other hand, the secondary cell or the secondary cell group is a cell or a cell group configured for the user equipment in addition to the primary cell.

In the carrier aggregation up to LTE Release 10 (Rel-10), as illustrated in the left side in FIG. 1, it is defined that user equipment uses multiple component carriers served from a single base station to conduct simultaneous communication. Meanwhile, in Rel-12, the carrier aggregation in Rel-10 is further enhanced, and as illustrated in the right side in FIG. 1, dual connectivity (DC) where the user equipment uses multiple component carriers served from multiple base stations to conduct the simultaneous communication is discussed. For example, if all component carriers cannot be accommodated in a single base station, it is considered that the dual connectivity can be effectively utilized to achieve a throughput nearly equal to that in Rel-10.

In the dual connectivity, a split bearer is configured. In the case where a master base station or a macro base station (MeNB) is used as an anchor node for distributing the bearer, as illustrated in FIG. 2, the master base station distributes downlink packets received from a S-GW (Serving Gateway) into packets for transmission to the user equipment via its own cell and packets for transmission to the user equipment via a secondary base station (SeNB). If the split bearer using the master base station as the anchor node is configured, as illustrated in FIG. 3, the user equipment has a physical layer (PHY), a MAC (Medium Access Control) layer (m-MAC) and an RLC (Radio Link Control) layer (m-RLC) for the master base station; a PHY layer, a s-MAC layer and a s-RLC layer for the secondary base station; and a PDCP layer coupled to the m-RLC layer and the s-RLC layer. Packets received from the master base station and packets received from the secondary base station are reordered at the PDCP layer, which are then delivered to an upper layer.

Also, according to LTE standard, re-establishment is performed on the PLC layer and the PDCP layer in handover and reconnection. In the re-establishment of the RLC layer, the transmitting side in the RLC layer discards all of to-be-transmitted RLC PDUs (Packet Data Units) while the receiving side in the RLC layer re-assembles as many RLC SDUs (Service Data Units) as possible from the received RLC PDUs and delivers the re-assembled RLC SDUs to the PDCP layer. Also, various timers for use in the RLC layer are stopped and reset, and all various variables are initialized.

On the other hand, in the re-establishment of the PDCP layer, the transmitting side in the PDCP layer retransmits PDCP PDUs, whose acknowledgement (ACK) has not been received at the RLC layer, while the receiving side in the PDCP layer reorders RIC SDUs received with the re-establishment of the RLC layer and RLC SDUs newly transmitted after execution of the re-establishment. Here, the PDCP layer performs different control operations with a reception window for reordering on the RLC SDUs received with the re-establishment of the RLC layer and the newly transmitted RLC SDUs. Specifically, the PDCP layer does not update the reception window for the RLC SDUs received with the re-establishment in the RLC layer if PDCP sequence numbers of the received packets are out of sequence, but the PDCP layer updates the reception window for the newly transmitted RLC SDUs even if the PDCP sequence numbers of the received packets are out of sequence.

See 3GPP R2-131782 in details, for example.

SUMMARY OF INVENTION

Problem to be Solved by the Invention

In cases where the split bearer is deleted in dual connectivity, the above-stated operations for handover and reconnection are not performed presently. For example, as illustrated in FIG. 4, when the split bearer is deleted in downlink communication, all RLC PDUs #1 to #4, which are waiting for reordering due to no reception of RLC PDU #0 at the s-RLC layer, are discarded. As a result, after the split bearer is released, the master base station needs to retransmit not only the reception-waiting RLC PDU #0 but also the RLC PDUs #1 to #4 received at the s-RLC layer in the user equipment, which reduces throughput. Although downlink packets can be transmitted in the split bearer from both the master base station and the secondary base station, the case where packets are transmitted from only the secondary base station is illustrated in FIG. 4 for ease in description.

Also, in the split bearer, uplink communication from the user equipment is conducted by switching between two transmission directions, transmission to the master base station and transmission to the secondary base station, by RRC signaling. At switch timings of the uplink transmission direction, the re-establishment is not presently performed on the PDCP layer and the RLC layer. As a result, as illustrated in FIG. 5, for example, PDCP PDUs #0 to #3 distributed for transmission to the secondary base station in the uplink communication are still transmitted to the secondary base station even after changing the uplink transmission direction from the secondary base station to the master base station. On the other hand, after the uplink transmission direction change command, the secondary base station may stop reception from the user equipment, and RLC PDUs #0 to #3 generated from the PDCP PDUs #0 to #3 would be unnecessarily transmitted. For ease of description, PDCP PDU:

RLC PDU=1:1 is set in FIG. 5. If the user equipment transmits packets subsequent to the RLC PDU #4 to the post-changed master base station but the secondary base station has not received the RLC PDUs #0 to #3, the master base station would receive the RLC PDU #4 before the RLC PDU #0 to #3. Since the re-establishment is not conducted, the PDCP layer in the master base station would discard the subsequently arriving RLC PDUs #0 to #3 as being out of the reception window.

In light of the above-stated problem, an object of the present invention is to provide some techniques for implementing efficient transmission of uplink packets when the uplink transmission direction is changed in the split bearer.

Means for Solving the Problem

In order to achieve the above object, one aspect of the present invention relates to user equipment, comprising: a transmission and reception unit configured to communicate with a master base station and a secondary base station simultaneously in dual connectivity; an RLC (Radio Link Control) layer processing unit configured to have an RLC layer for the master base station and an RLC layer for the secondary base station; and a PDCP (Packet Data Convergence Protocol) layer processing unit configured to have a PDCP layer transmitting and receiving data to/from the RLC layer for the master base station and the RLC layer for the secondary base station, wherein when a transmission direction of uplink data packets is changed in a split bearer configured for the master base station and the secondary base station, the RLC layer processing unit performs re-establishment on the RLC layer for the master base station and the RLC layer for the secondary base station, and the PDCP layer processing unit performs re-establishment on the PDCP layer.

Another aspect of the present invention relates to a base station, comprising: a transmission and reception unit configured to communicate with user equipment in dual connectivity; an RLC (Radio Link Control) layer processing unit configured to have an RLC layer to communicate with the user equipment; and a PDCP (Packet Data Convergence Protocol) layer processing unit configured to have a PDCP layer to communicate with the user equipment, wherein the PDCP layer processing unit has an uplink reordering timer, and when a transmission direction of uplink data packets is changed in a split bearer configured for the user equipment, the PDCP layer processing unit activates the uplink reordering timer and if sequence numbers of uplink data packets received from the user equipment are out of sequence, suspends transmitting the received uplink data packets to an upper layer.

Advantage of the Invention

According to the present invention, it is possible to achieve efficient transmission of uplink packets when the uplink transmission direction is changed in the split bearer.

BRIEF DESCRIPTION OF DRAWINGS

FIG. 1 is a schematic diagram for illustrating carrier aggregation;

EMBODIMENTS OF THE INVENTION

Embodiments of the present invention are described below with reference to the drawings.

In embodiments as stated below, user equipment and base stations supporting dual connectivity are disclosed. Summarizing embodiments as stated below, in downlink communication in the split bearer, when a split bearer configured for a secondary base station is deleted, the user equipment performs re-establishment on an s-RLC layer, and the s-RLC layer assembles as many RLC SDUs as possible without discarding RLC PDUs waiting for reordering and transmits them to a PDCP layer. In addition, the user equipment performs re-establishment on the PDCP layer, and even if out-of-sequence in RLC SDUs (PDCP PDUs) received before expiration of a reordering timer is not eliminated, the PDCP layer uses the reordering timer to transmit the PDCP PDUs waiting for reordering to an upper layer. As a result, even if the missing RLC PDUs are not transmitted to the user equipment due to discarding or others, it is possible to avoid the situation where the PDCP PDUs waiting for reordering cannot be transmitted to the upper layer.

Also, in another embodiment, when the transmission direction of uplink data packets is changed in uplink communication in the split bearer, the user equipment performs the re-establishment on the RLC layer and the PDCP layer. As a result, the user equipment can stop transmitting data packets distributed to a pre-changed transmission direction and transmit untransmitted data packets to a post-changed base station in sequence.

Figure 6:
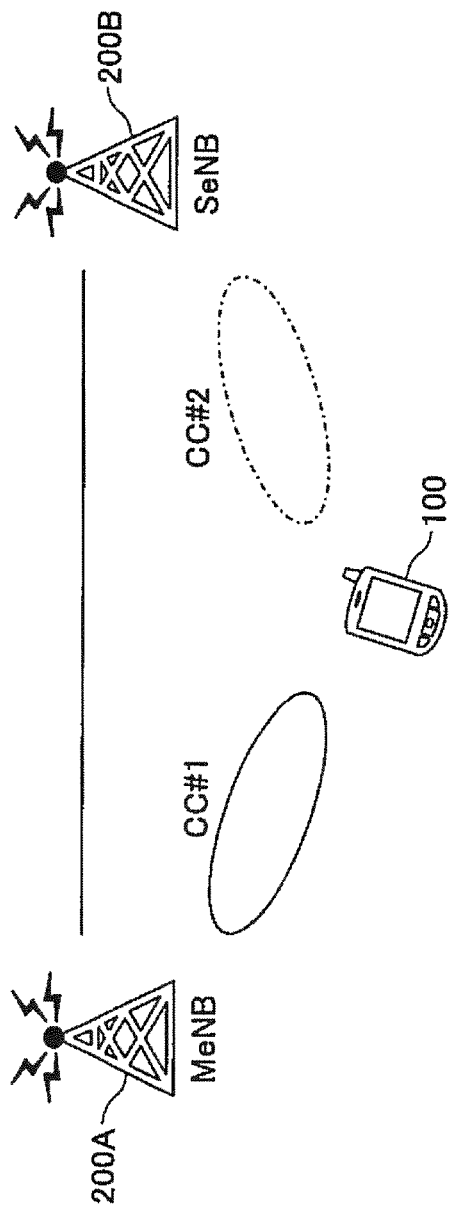
FIG. 6 is a schematic diagram for illustrating a radio communication system according to one embodiment of the present invention.

A radio communication system according to one embodiment of the present invention is described with reference to FIG. 6. FIG. 6 is a schematic diagram for illustrating a radio communication system according to one embodiment of the present invention.

As illustrated in FIG. 6, a radio communication system 10 has user equipment 100 and base stations 200A, 200B. The radio communication system 10 supports dual connectivity where the user equipment 100 uses component carriers CC#1, CC#2 served from the multiple base stations 200A, 200B to conduct simultaneous communication, and as illustrated, the user equipment 100 uses a dual connectivity function to communicate with the master base station (MeNB) 200A and the secondary base station (SeNB) 200B. In the illustrated embodiment, only the two base stations 200A, 200B are illustrated, but a large number of base stations 200 are generally disposed to cover a service area of the radio communication system 10.

The user equipment 100 has the dual connectivity function to communicate with the multiple base stations 200A, 200B simultaneously. Typically, as illustrated, the user equipment 100 may be any appropriate information processing device with a radio communication function such as a smartphone, a mobile phone, a tablet and a mobile router. The user equipment 100 is arranged with a CPU (Central Processing Unit) such as a processor, a memory device such as a RAM (Random Access Memory) and a flash memory, a radio communication device for transmitting and receiving radio signals to/from the base stations 200A, 200B and so on. For example, functions and operations of the user equipment 100 as stated below may be implemented by the CPU processing and running data and programs stored in the memory device. However, the user equipment 100 is not limited to the above-stated hardware configuration and may be arranged with circuits for implementing one or more of operations as stated below.

The base stations 200A, 200B (which may be collectively referred to as the base stations 200 hereinafter) establish a radio connection to the user equipment 100 to transmit downlink (DL) packets received from network devices, such as an upper station and a server, communicatively connected on a core network (not shown) to the user equipment 100 as well as transmit uplink (UL) packets received from the user equipment 100 to the network devices. In the illustrated embodiment, the base station 200A serves as a master base station (MeNB) or a primary base station, and the base station 200B serves as a secondary base station (SeNB). In the dual connectivity, the master base station 200A controls simultaneous communication between the user equipment 100 and the base stations 200A, 200B in accordance with the dual connectivity and controls communication with the upper core network (not shown). The base station 200 is typically arranged with hardware resources such as an antenna for transmitting and receiving radio signals to/from the user equipment 100, a communication interface for communicating with an adjacent base station 200, a processor and a circuit for processing signals transmitted and received to/from the user equipment 100 and the adjacent base station 200. Functions and operations of the base station 200 as stated below may be implemented by the processor processing and running data and programs stored in the memory device. However, the base station 200 is not limited to the above-stated hardware configuration and may have any other appropriate hardware configuration.

Figure 7:
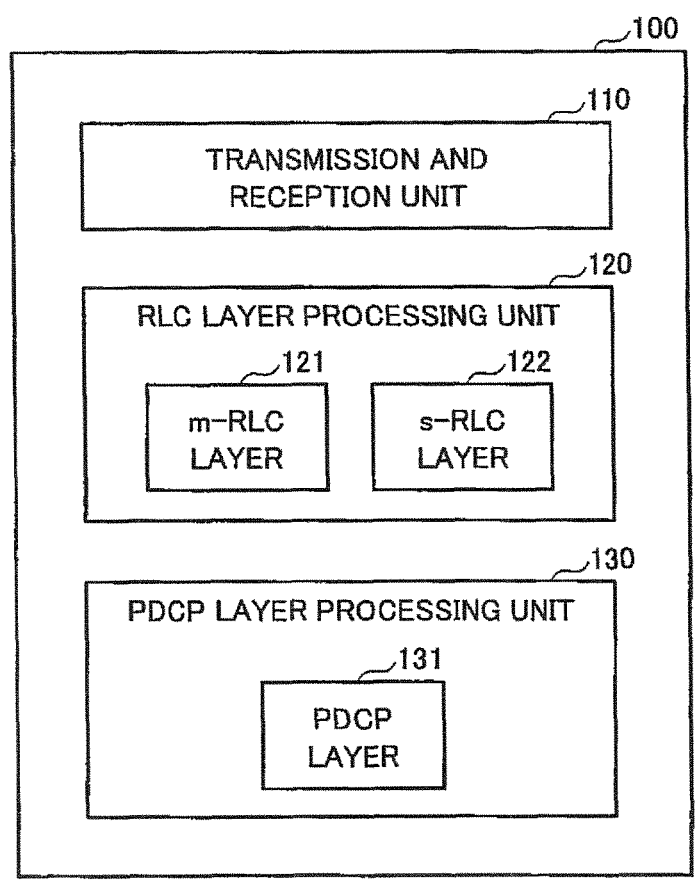
FIG. 7 is a block diagram for illustrating an arrangement of user equipment according to one embodiment of the present invention.

Next, an arrangement of the user equipment according to one embodiment of the present invention is described with reference to FIG. 7. FIG. 7 is a block diagram for illustrating an arrangement of the user equipment according to one embodiment of the present invention.

As illustrated in FIG. 7, the user equipment 100 has a transmission and reception unit 110, an RLC layer processing unit 120 and a PDCP layer processing unit 130.

The transmission and reception unit 110 communicates with the master base station 200A and the secondary base station 200B simultaneously in dual connectivity. Specifically, the transmission and reception unit 110 transmits and receives various radio channels, such as uplink/downlink control channels and uplink/downlink data channels, to/from the master base station 200A and the secondary base station 200B.

The RLC layer processing unit 120 has an RLC (m-RLC) layer 121 for the master base station 200A and an RLC (s-RLC) layer for the secondary base station 200B. In downlink communication in the split bearer, the m-RLC layer 121 assembles RLC SDUs from RLC PDUs received from the master base station 200A and transmits them to the PDCP layer processing unit 130. On the other hand, the s-RLC layer 122 assembles RLC SDUs from packets (RLC PDUs) received from the secondary base station 200B and transmits them to the PDCP layer processing unit 130. Also, in uplink communication in the split bearer, the m-RLC layer 121 assembles RLC PDUs from PDCP PDUs received from the PDCP layer processing unit 130 and transmits them to the master base station 200A via a lower layer (not shown). On the other hand, the s-RLC layer 122 assembles RLC PDUs from packets PDCP PDUs received from the PDCP layer processing unit 130 and transmits them to the secondary base station 200B via the lower layer (not shown).

The PDCP layer processing unit 130 has a PDCP layer 131 transmitting and receiving data to/from the m-RLC layer 121 for the master base station 200A and the s-RLC layer 122 for the secondary base station 200B. In downlink communication in the split bearer, the PDCP layer 131 receives RLC SDUs from the m-RLC layer 121 and the s-RLC layer 122, reorders the received packets based on sequence numbers (SNs) of the respective packets and transmits the reordered packets to an upper layer (not shown). In the reordering, the PDCP layer processing unit 130 uses a reception window. For packets received from the RLC layers with re-establishment, if the sequence numbers are out of sequence, the PDCP layer processing unit 130 does not update the reception window. For packets newly transmitted rather than with the re-establishment, on the other hand, even if the sequence numbers are out of sequence, the PDCP layer processing unit 130 determines that the packets have been discarded at the base station 200A or 200B serving as the transmitting side and updates the reception window. Also, in uplink communication in the split bearer, the PDCP layer 131 distributes to-be-transmitted PDCP PDUs into packets to be transmitted to the master base station 200A and packets to be transmitted to the secondary base station 200B and transmits the distributed packets to the m-RLC layer 121 and the s-RLC layer 122.

Figure 2:
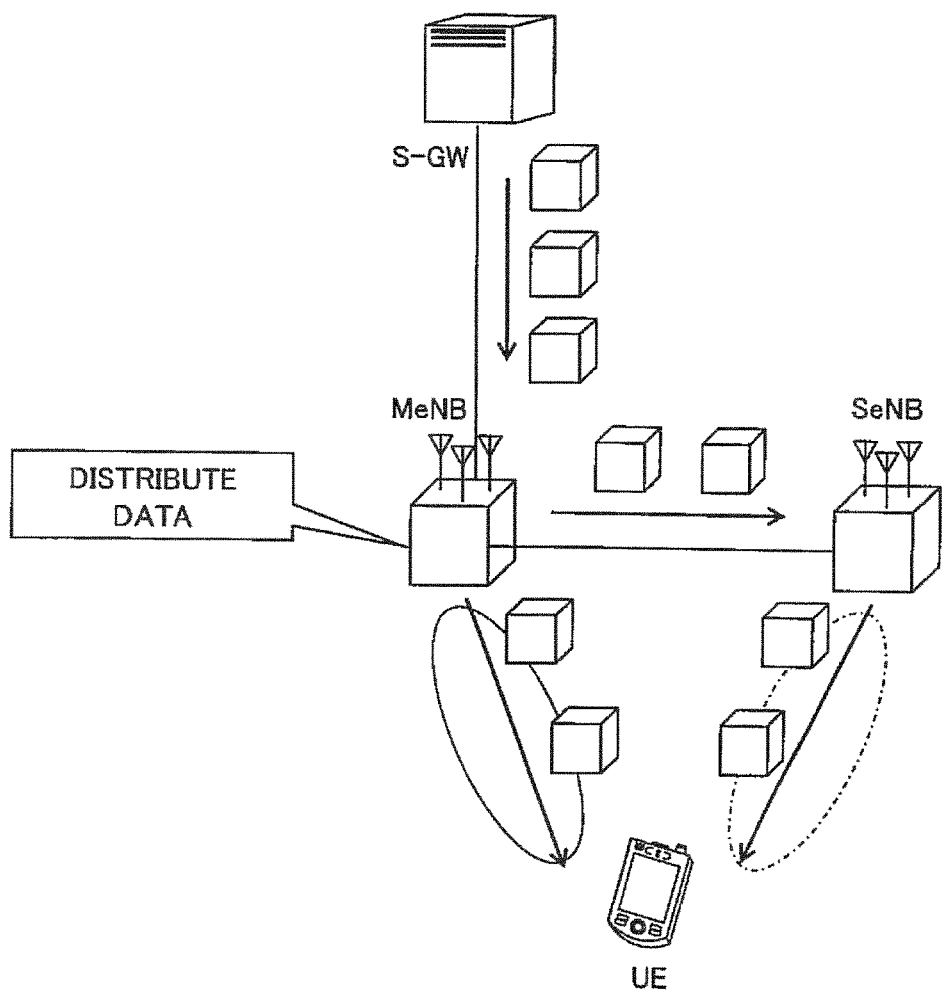
FIG. 2 is a schematic diagram for illustrating split bearer operations where a macro base station serves as an anchor node.
Figure 3:
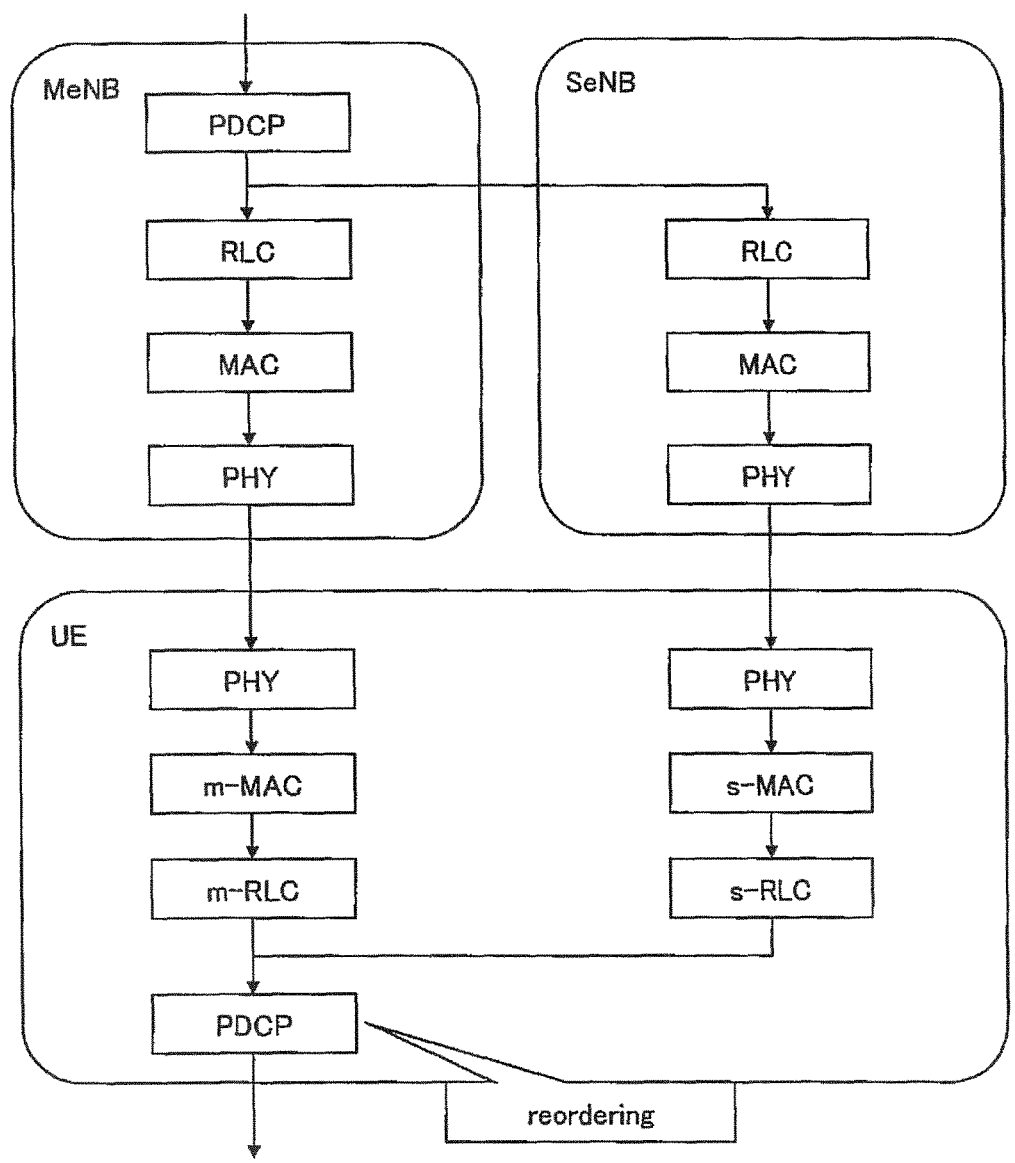
FIG. 3 is a diagram for illustrating a layer structure for downlink communication in configured split bearer.
Figure 4:
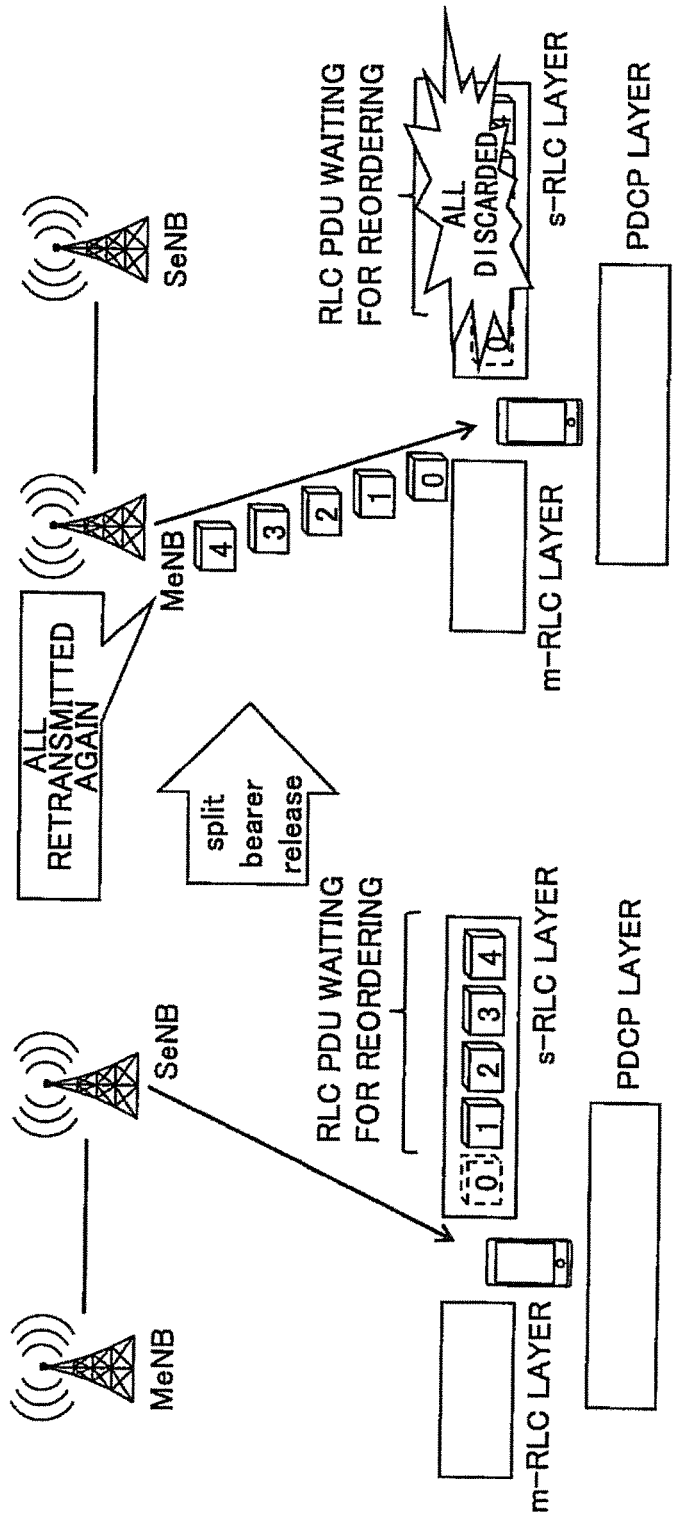
FIG. 4 is a schematic diagram for illustrating conventional split bearer deletion operations.
Figure 8:
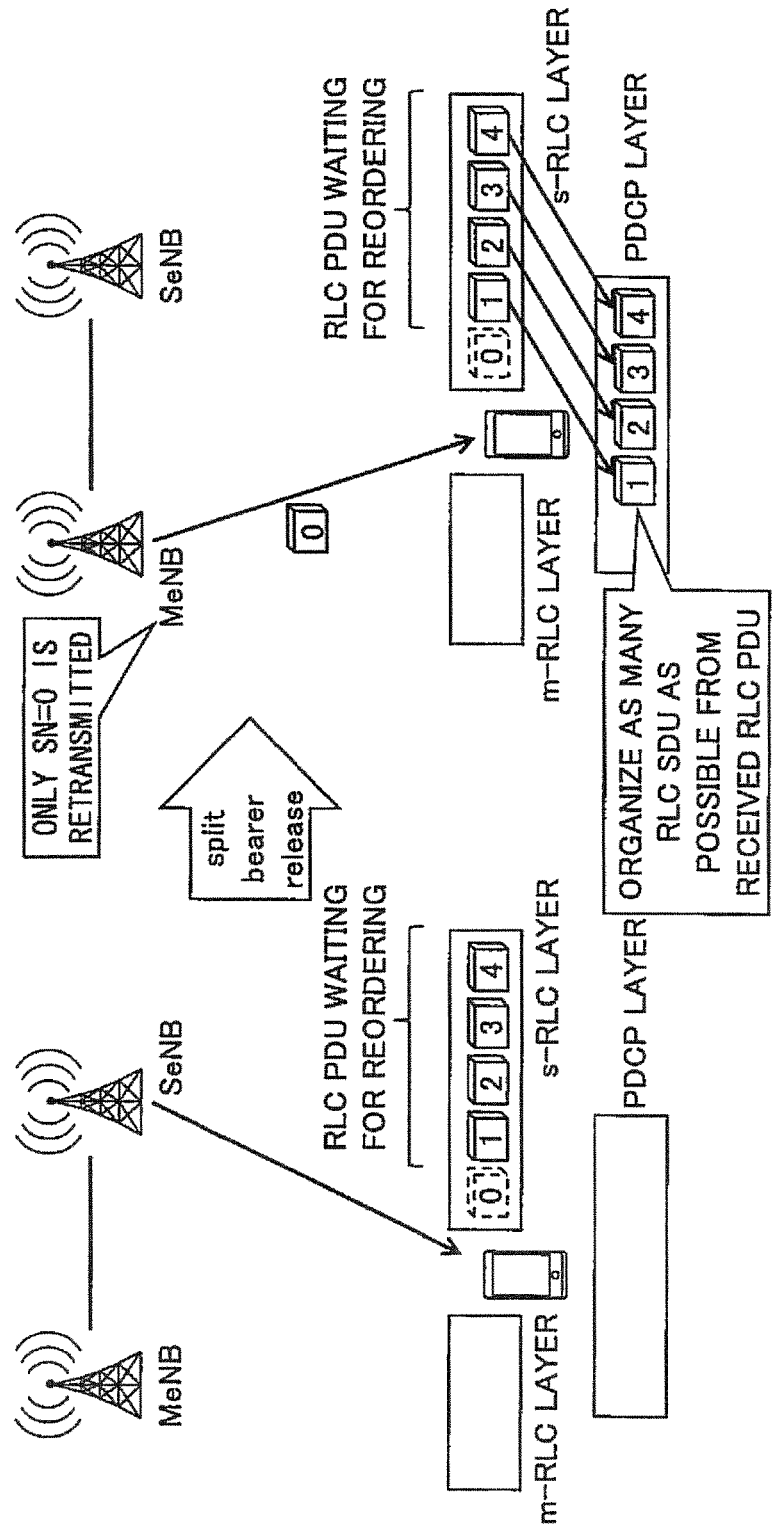
FIG. 8 is a schematic diagram for illustrating split bearer deletion operations according to a first embodiment of the present invention.

Next, split bearer deletion according to the first embodiment of the present invention is described with reference to FIGS. 8-12. As stated above with reference to FIG. 4, in conventional split bearer deletion, all packets waiting for reordering at the s-RLC layer 122 are discarded before deletion, and after the split bearer for the secondary base station 200B is deleted, the master base station 200A must retransmit the discarded packets. According to the first embodiment of the present invention, as illustrated in FIG. 8, before deletion of the split bearer, the RLC layer processing unit 120 assembles as many RLC SDUs as possible from the packets (RLC-PUDs) waiting for reordering at the s-RLC layer 122 and transmits the RLC SDUs to the PDCP layer processing unit 130. As a result, after deletion of the split bearer for the secondary base station 200B, the master base station 200A has to retransmit only the packets waiting for reception, which can avoid reduction in throughput.

In the first embodiment, when the split bearer configured for the secondary base station 200B is deleted, the RLC layer processing unit 120 performs re-establishment on the s-RLC layer 122 for the secondary base station 200B and releases the split bearer after execution of the re-establishment. For example, in the LTE standard, upon receiving a split bearer deletion command from the master base station 200A or the secondary base station 200B, the RLC layer processing unit 120 performs re-establishment on the s-RLC layer 122 configured for a secondary cell group (SCG) and then releases the split bearer.

In one embodiment, the RLC layer processing unit 120 may transmit data packets staying in the s-RLC layer 122 for the secondary base station 200B or the SCG to the PDCP layer processing unit 130 in the re-establishment. For example, the staying data packets are RLC PDUs waiting for reordering at the s-RLC layer 122 for the secondary base station 200B or the SCG, and the RLC layer processing unit 120 may assemble RLC SDUs from the RLC PDUs waiting for reordering and transmit the RLC SUDs to the PDCP layer processing unit 130. When the RLC SDUs are assembled from the RLC PDUs waiting for reordering, similar to re-establishment in handover or reconnection, the RLC layer processing unit 120 re-assembles as many RLC SDUs as possible from the RLC PDUs waiting for reordering and delivers the re-assembled RLC SDUs to the PDCP layer processing unit 130.

Also, in one embodiment, if releasing the split bearer is deletion on a per EPS (Evolved Packet System) bearer basis, the RLC layer processing unit 120 may delete the indicated EPS bearer without execution of re-establishment for the s-RLC layer 122 for the secondary base station 200B or the SCG. Specifically, in the LTE standard, if releasing the split bearer is deletion on a per-EPS bearer basis, the RLC layer processing unit 120 may not perform re-establishment on the s-RLC layer 122 for the secondary base station 200B or the SCG to re-assemble RLC SDUs from RLC PDUs waiting for reordering and transmit the RLC SDUs to the PDCP layer processing unit 130.

Figure 9:
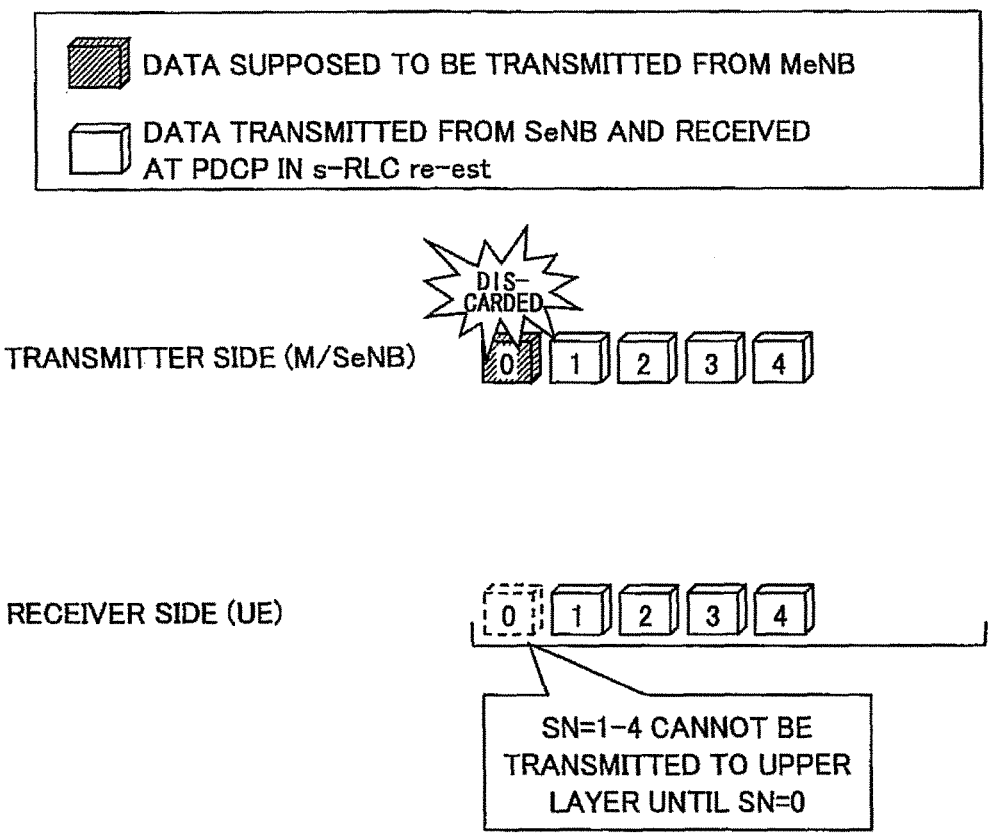
FIG. 9 is a schematic diagram for illustrating conventional reordering operations at a PDCP layer in RLC layer re-establishment.

As stated above, when the split bearer is deleted, the RLC layer processing unit 120 performs the re-establishment on the s-RLC layer 122 and re-assembles as many RLC SDUs as possible from the RLC PDUs without discarding the RLC PDUs waiting for reordering. Then, the conventional PDCP layer changes operations for the received PDCP PDUs depending on operations at an lower layer and performs different operations, for example, handling missing packets as packets waiting for reordering or discarding the missing packets. In the above-stated case where the re-establishment is performed on the s-RLC layer 122, when the reordering is performed similar to the conventional one, unnecessary waiting for reordering would arise. For example, as illustrated in FIG. 9, if the PDCP layer processing unit 130 receives re-assembled RLC SDUs #1 to #4 from the s-RLC layer 122, the PDCP layer processing unit 130 waits for reception of RLC SDU #0 retransmitted from the master base station 200A for reordering. If the master base station 200A discards the RLC SDU #0, the PDCP layer processing unit 130 cannot receive the RLC SDU #0 and accordingly deliver the RLC SDUs #1 to #4 waiting for reordering to an upper layer. Accordingly, it is undesirable from standpoints of performance that in the case where the re-establishment is performed on the s-RLC layer 122, the PDCP layer processing unit 130 performs the reordering similar to the conventional manner.

Figure 10:
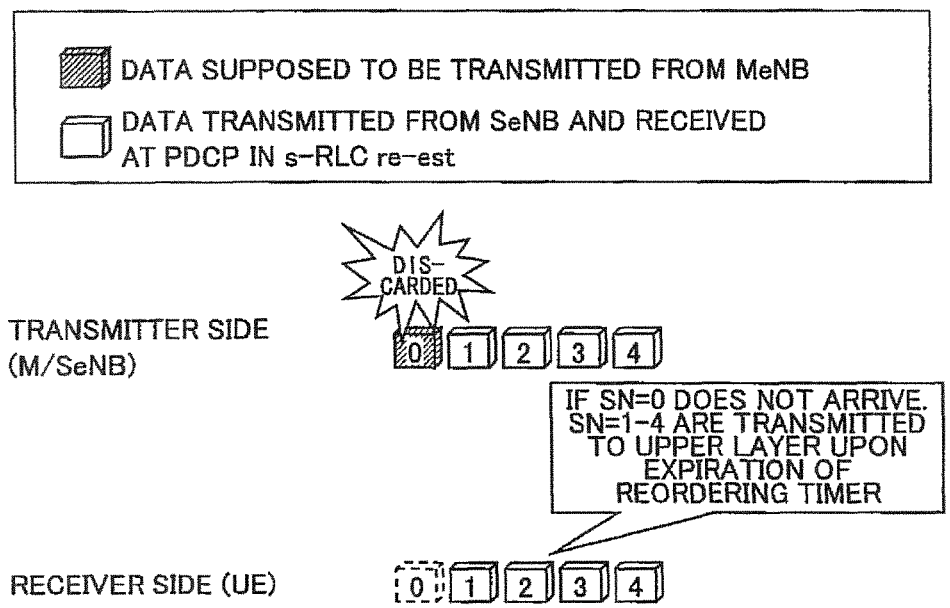
FIG. 10 is a schematic diagram for illustrating reordering operations at the PDCP layer in RLC layer re-establishment according to the first embodiment of the present invention.

To this end, according to the first embodiment of the present invention, the PDCP layer processing unit 130 has a reordering timer activated in response to detecting that data packets are out of sequence, and uses the reordering timer to control reordering of packets received from the RLC layer processing unit 120 regardless of whether the re-establishment has been performed on the s-RLC layer 122. Specifically, upon expiration of the reordering timer, the PDCP layer processing unit 130 transmits data packets, which are waiting for reordering and are received from the RLC layer processing unit 120, to an upper layer. For example, as illustrated in FIG. 10, if the PDCP layer processing unit 130 receives RLC SDUs #1 to #4 from the s-RLC layer 122, the PDCP layer processing unit 130 detects that RLC SDU #0 is missing and activates the reordering timer. If the PDCP layer processing unit 130 has failed to receive the RLC SDU #0 by expiration of the reordering timer, the PDCP layer processing unit 130 delivers the RLC SDUs #1 to #4 waiting for reordering to an upper layer. As a result, even in the case where the master base station 200A has discarded the RLC SDU #0, upon expiration of the reordering timer, the PDCP layer processing unit 130 can deliver the RLC SDUs #1 to #4 to the upper layer.

In one embodiment, the PDCP layer processing unit 130 may determine whether data packets waiting for reordering and received from the RLC layer processing unit 120 have been transmitted in connection with re-establishment on the m-RLC layer 121 for the master base station 200A and control the reordering timer depending on the determination. For example, in the case where the data packets waiting for reordering have not been transmitted in connection with the re-establishment on the m-RLC layer 121 for the master base station 200A, in other words, in the case where the re-establishment has been performed on the s-RLC layer 122 or in normal cases where the re-establishment is not performed, upon expiration of the reordering timer, the PDCP layer processing unit 130 transmits the data packets waiting for reordering and received from the RLC layer processing unit 120 to an upper layer.

On the other hand, in the case where the data packets waiting for reordering have been transmitted in connection with the re-establishment on the m-RLC layer 122 for the master base station 200A, the PDCP layer processing unit 130 performs reordering for handover or reconnection. Specifically, the PDCP layer processing unit 130 uses a reception window to reorder data packets received with the re-establishment and data packets newly transmitted after deletion of the split bearer. If there is a missing one in the data packets received with the re-establishment, the PDCP layer processing unit 130 does not update the reception window, and if there is a missing one in the newly transmitted data packets, the PDCP layer processing unit 130 updates the reception window. If the PDCP layer processing unit 130 receives the data packet falling in the reception window, the PDCP layer processing unit 130 updates the reception window with the sequence number of the received data packet, and if the PDCP layer processing unit 130 receives the data packet being out of the reception window, the PDCP layer processing unit 130 discards the data packet. In this manner, even if the RLC SDUs waiting for reception from the master base station 200A have been discarded, the PDCP layer processing unit 130 can use the reordering timer to deliver the RLC SDUs received with the re-establishment on the s-RLC layer 122 to an upper layer.

Figure 11:
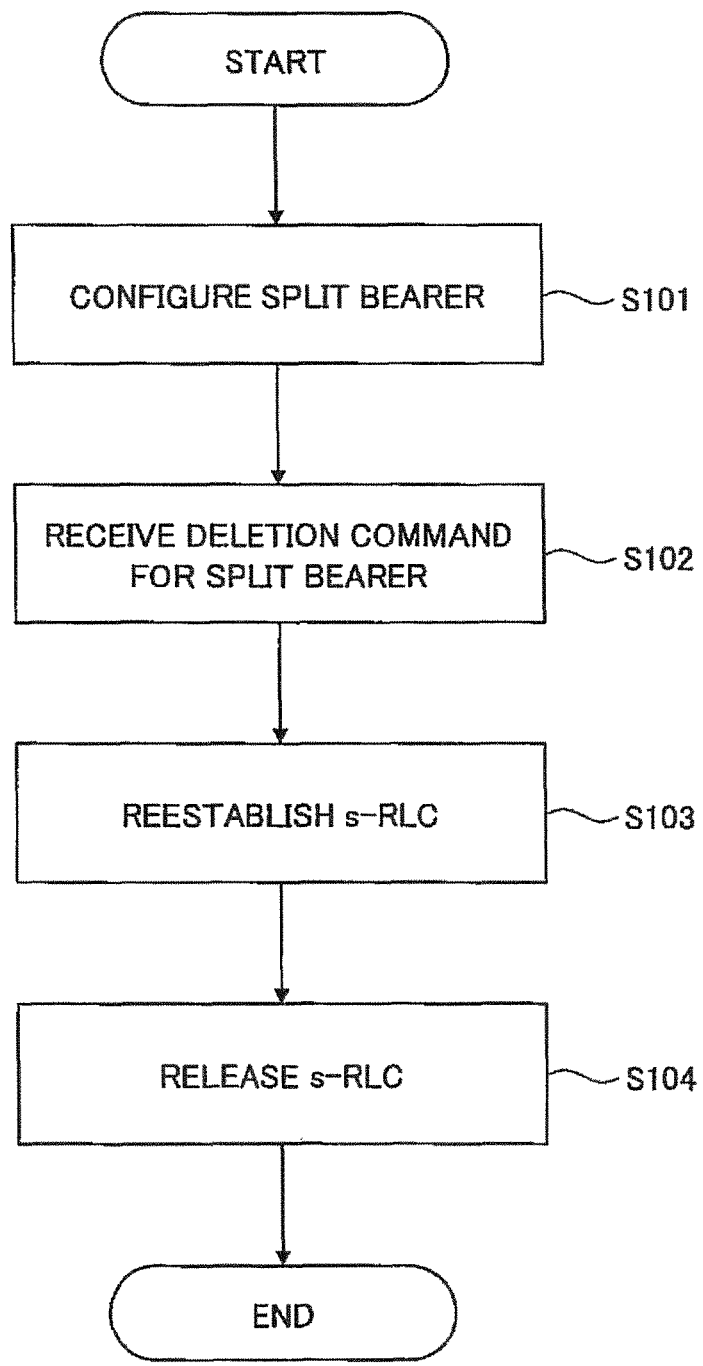
FIG. 11 is a flowchart for illustrating split bearer deletion in an RLC layer processing unit according to the first embodiment of the present invention.

FIG. 11 is a flowchart for illustrating split bearer deletion at the RLC layer processing unit according to the first embodiment of the present invention.

As illustrated in FIG. 11, at step S101, the master base station 200A configures split bearer for the user equipment 100. The split bearer configuration command may be indicated by RRC signaling, for example.

At step S102, the master base station 200A indicates the user equipment 100 to delete the split bearer. The split bearer deletion command may be indicated by RRC signaling, for example.

At step S103, the RLC layer processing unit 120 performs re-establishment on the s-RLC layer 122. Specifically, the RLC layer processing unit 120 assembles as many RLC SDUs as possible from RLC PDUs waiting for reordering at the s-RLC layer 122 and delivers them to the PDCP layer processing unit 130.

At step S104, the RLC layer processing unit 120 releases the s-RLC layer 122.

Figure 12:
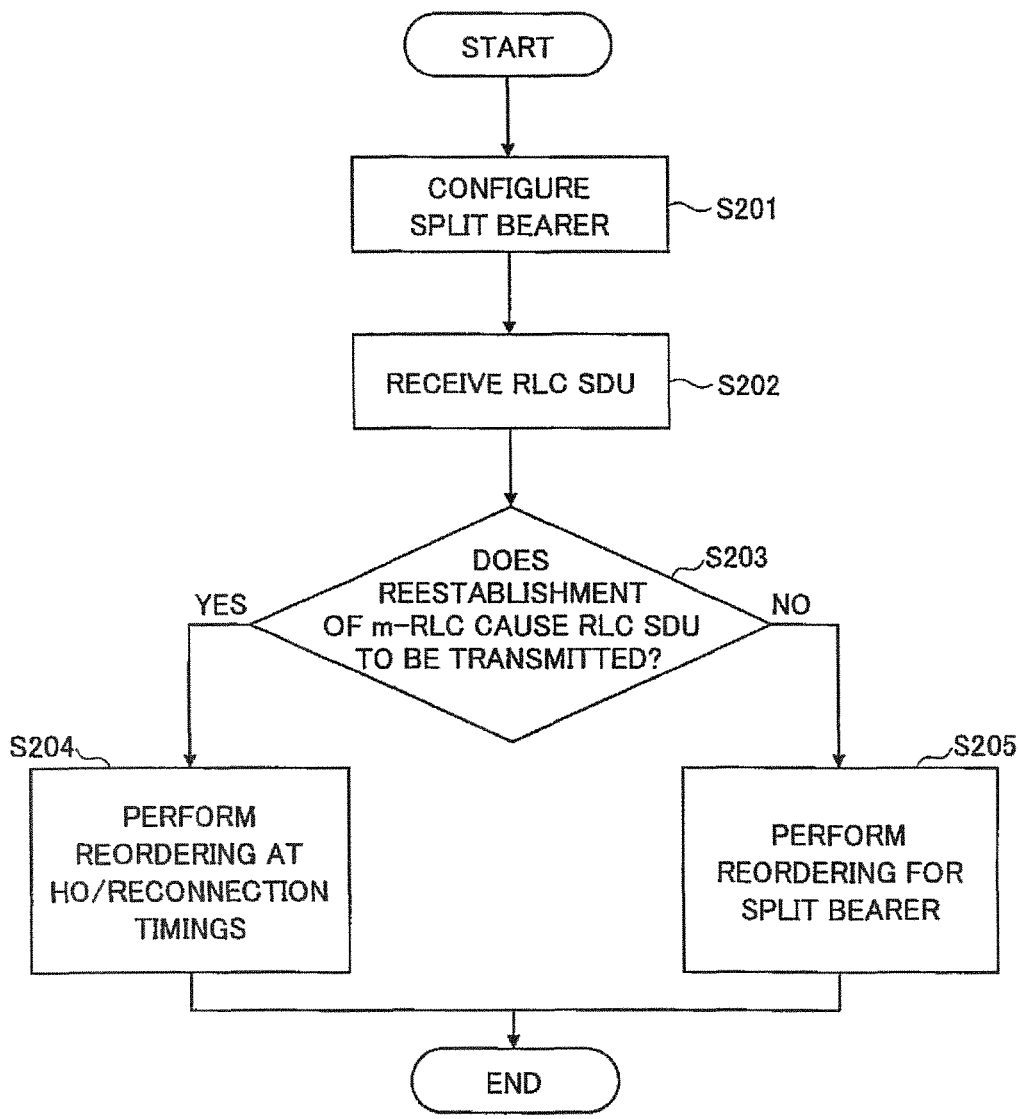
FIG. 12 is a flowchart for illustrating split bearer deletion in a PDCP layer processing unit according to the first embodiment of the present invention.

FIG. 12 is a flowchart for illustrating split bearer deletion at the PDCP layer processing unit according to the first embodiment of the present invention.

As illustrated in FIG. 12, at step S201, the master base station 200A configures split bearer for the user equipment 100. The split bearer configuration command may be indicated by RRC signaling, for example. At step S202, upon receiving the split bearer deletion command from the master base station 200A, in response to the split bearer deletion command, the PDCP layer processing unit 130 receives RLC SDUs assembled from RLC PDUs waiting for reordering from the RLC layer processing unit 120.

At step S203, the PDCP layer processing unit 130 determines whether the received RLC SDUs have been transmitted in connection with re-establishment on the m-RLC layer 121. If the received RLC SDUs have been transmitted in connection with re-establishment on the m-RLC layer 121 (S203: Yes), at step S204, the PDCP layer processing unit 130 performs reordering for handover or reconnection.

On the other hand, if the received RLC SDs have not been transmitted in connection with the re-establishment on the m-RLC layer 121 (S203: No), at step S205, the PDCP layer processing unit 130 performs reordering for the split bearer. Specifically, if the sequence numbers of the received RLC SDUs are out of sequence, the PDCP layer processing unit 130 activates the reordering timer. Then, if a missing one of the RLC SDUs has not been received by expiration of the reordering timer, the PDCP layer processing unit 130 assembles PDCP SDUs from the RLC SDUs (PDCP PDUs) waiting for reordering and delivers them to an upper layer.

Figure 5:
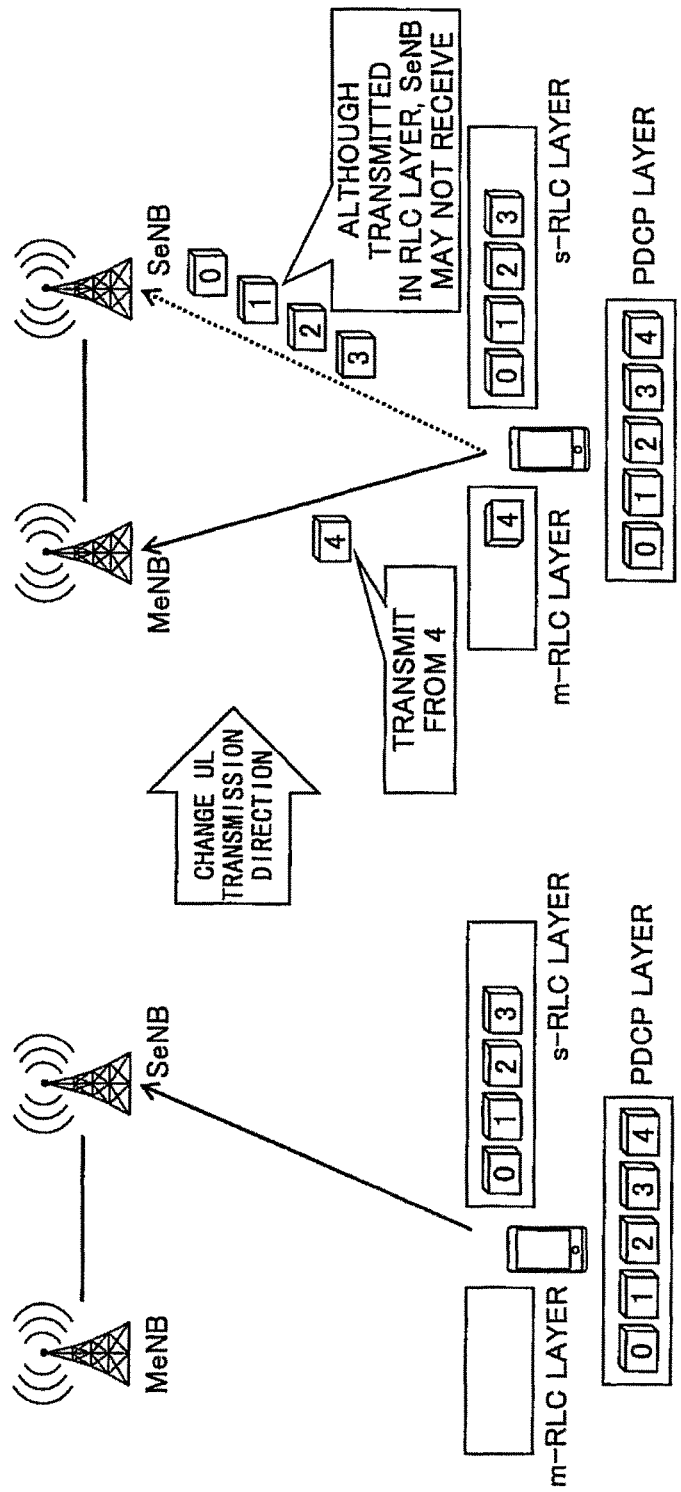
FIG. 5 is a schematic diagram for illustrating conventional uplink transmission direction change operations.

Next, uplink transmission direction change operations in split bearers according to the second embodiment of the present invention are described with reference to FIGS. 13-14. As stated above with reference to FIG. 5, in conventional uplink transmission direction change operations, data packets (RLC PDUs #0 to #3 in the s-RLC layer 122 in the example illustrated in FIG. 5) distributed from the PDCP layer in a pre-changed transmission direction are transmitted to a pre-changed base station 200 (the secondary base station 200B in the example illustrated in FIG. 5) even after changing the uplink transmission direction, and there is a likelihood of unsuccessful reception. According to the second embodiment of the present invention, if the uplink transmission direction has been changed in the split bearer, the RLC layer processing unit 120 and the PDCP layer processing unit 130 perform re-establishment on the RLC layer and the PDCP layer, respectively. As a result, the user equipment 100 can stop transmitting the data packets distributed in the pre-changed transmission direction and transmitting the untransmitted data packets in the post-changed base station 200 in sequence.

In the second embodiment, when the transmission direction of uplink data packets is changed in the split bearers configured for the master base station 200A and the secondary base station 200B, the RLC layer processing unit 120 performs re-establishment on the m-RLC layer 121 for the master base station 200A and the s-RLC layer 122 for the secondary base station 200B, and the PDCP layer processing unit 130 performs the re-establishment on the PDCP layer 131. For example, in the LTE standard, upon receiving an uplink transmission direction change command from the master base station 200A or the secondary base station 200B, the RLC layer processing unit 120 performs the re-establishment on the m-RLC layer 121 and the s-RLC layer 122, and the PDCP layer processing unit 130 performs the re-establishment on the PDCP layer 131.

The transmission direction change of uplink data packets may be triggered with handover between master base stations, for example. Specifically, when a handover procedure between the master base stations (inter-MeNB HO) is activated in the split bearer, the user equipment 100 receives a handover command (HO command) including a dual connectivity deletion command and changes the transmission direction of uplink data packets from the secondary base station 200B to the master base station 200A in accordance with the dual connectivity deletion command. When the transmission direction of uplink data packets is changed from the secondary base station 200B to the master base station 200A, the RLC layer processing unit 120 performs re-establishment on the m-RLC layer 121 and the s-RLC layer 122, and the PDCP layer processing unit 130 performs re-establishment on the PDCP layer 131. In this manner, when the transmission direction of uplink data packets is changed, in response to activation of the inter-MeNB HO procedure, from the secondary base station 200B to the master base station 200A in the split bearers configured for the master base station 200A and the secondary base station 200B, the RLC layer processing unit 120 may perform the re-establishment on the m-RLC layer 121 for the master base station 200A and the s-RLC layer 122 for the secondary base station 200B, and the PDCP layer processing unit 130 may perform the re-establishment on the PDCP layer 131.

In one embodiment, the RLC layer processing unit 120 and the PDCP layer processing unit 130 may perform the re-establishment on the RLC layers 121, 122 and the PDCP layer 131 to stop transmitting uplink data packets distributed before changing the transmission direction and transmit the transmission-stopped uplink data packets to a base station in a post-changed transmission direction. In this case, for example, the RLC layer processing unit 120 and the PDCP layer processing unit 130 may perform the re-establishment on the RLC layers 121, 122 and the PDCP layer 131 to transmit the transmission-stopped uplink data packets in sequence of the sequence numbers. As a result, the untransmitted uplink data packets can be transmitted to the post-changed base station 200 in sequence, and data packets having earlier sequence numbers arrive at the post-changed base station 200 before, which can avoid a likelihood that data packets having later sequence numbers may be discarded as being out of a reception window.

In one embodiment, when a re-establishment command is received from the base station 200 for the pre-changed transmission direction, the RLC layer processing unit 120 and the PDCP layer processing unit 130 may perform the re-establishment. Specifically, there are some cases where the base station 200 continues receiving data packets even after changing the transmission direction and the re-establishment is unnecessary. Accordingly, in the case where the base station 200 for the pre-changed transmission direction can receive data packets even after changing the transmission direction, the base station 200 may indicate to the user equipment 100 whether the re-establishment is necessary. For example, only if the base station 200 for the pre-changed transmission direction indicates the re-establishment, the RLC layer processing unit 120 and the PDCP layer processing unit 130 may the re-establishment and may not perform the re-establishment in the other cases. Alternatively, only if the base station 200 for the pre-changed transmission direction indicates that the re-establishment should not be performed, the RLC layer processing unit 120 and the PDCP layer processing unit 130 may not perform the re-establishment and in the other cases, may perform the re-establishment. According to this embodiment, it is possible to avoid unnecessary re-establishment.

Also in one embodiment, the re-establishment may be performed on only uplink communication. When the uplink transmission direction is changed in the split bearer, the RLC layer processing unit 120 and the PDCP layer processing unit 130 may perform the re-establishment on only an uplink communication related portion for the RLC layers 121, 122 and the PDCP layer 131. If the re-establishment is also performed on a downlink communication related portion, the downlink communication is temporarily interrupted, which can be avoided. Specifically, the user equipment 100 may perform the re-establishment on only portions related to the transmitting side in the RLC layer and the PDCP layer, and the base station 200 may perform the re-establishment on only portions related to the receiving side in the RLC layer and the PDCP layer.

Figure 13:
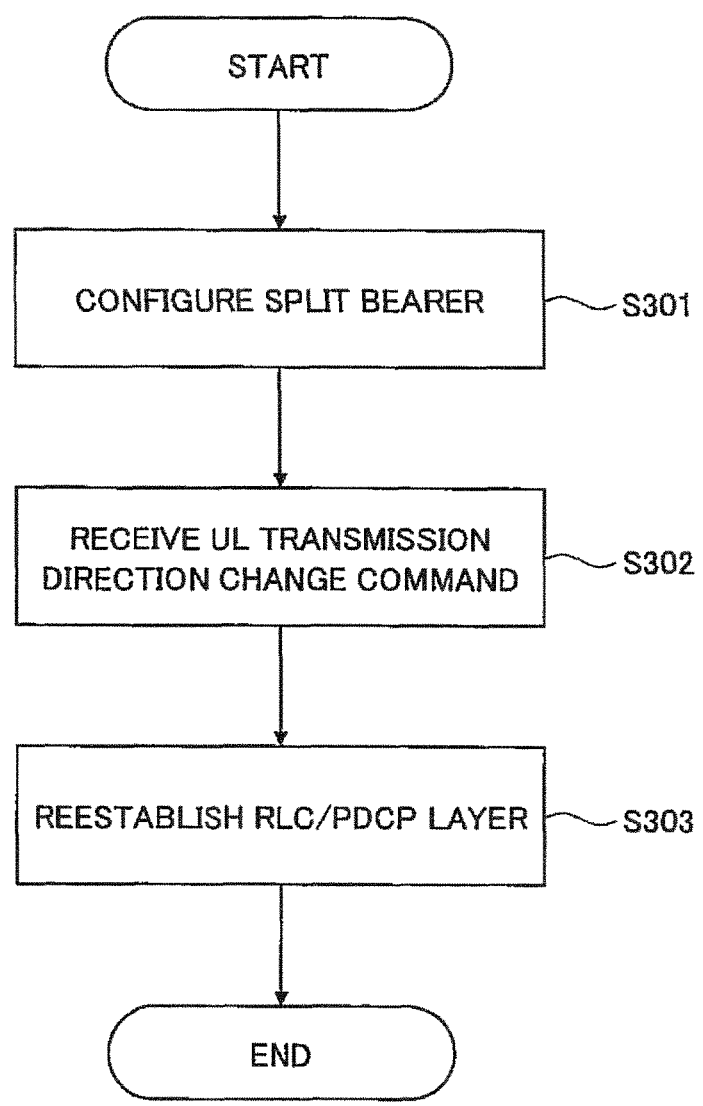
FIG. 13 is a flowchart for illustrating uplink transmission direction change operations in user equipment according to a second embodiment of the present invention.

FIG. 13 is a flowchart for illustrating an uplink transmission direction chancre operation in the user equipment according to the second embodiment of the present invention.

As illustrated in FIG. 13, at step S301, in response to a configuration command from the anchor base station 200, the user equipment 100 configures a split bearer for the non-anchor base station 200. The split bearer configuration command may be indicated by RRC signaling, for example.

At step S302, the user equipment 100 receives an uplink transmission direction change command. The uplink transmission direction change command may be indicated by RRC signaling, for example. Also, the uplink transmission direction change may be triggered with reception of a handover (HO) command including a dual connectivity deletion command indicated in response to activation of a handover procedure between master base stations (inter-MeNB HO).

At step S303, the RLC layer processing unit 120 and the PDCP layer processing unit 130 perform re-establishment on the m-RLC layer 121 and the s-RLC layer 122 and the PDCP layer 131, respectively. In one embodiment, the RLC layer processing unit 120 and the PDCP layer processing unit 130 may perform the re-establishment on the RLC layers 121, 122 and the PDCP layer 131 to stop transmitting uplink data packets distributed before changing the transmission direction and transmit the transmission-stopped uplink data packets to the base station 200 for the post-changed transmission direction in the order of the sequence numbers.

Figure 14:
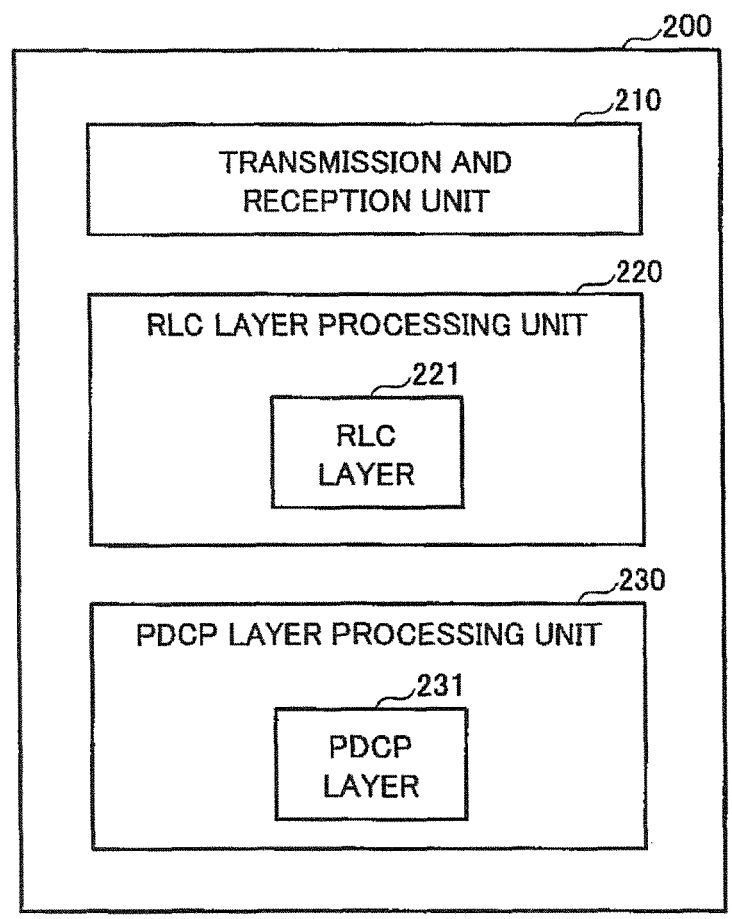
FIG. 14 is a block diagram for illustrating an arrangement of a base station according to the second embodiment of the present invention.

FIG. 14 is a block diagram for illustrating an arrangement of the base station according to the second embodiment of the present invention. The base station according to this embodiment has an uplink reordering timer in the PDCP layer and upon changing the uplink transmission direction in the split bearer, activates the uplink reordering timer and suspends delivering data packets received from the user equipment 100 to an upper layer before the sequence number becomes in sequence during activation of the uplink reordering timer.

As illustrated in FIG. 14, the base station 200 has a transmission and reception unit 210, an RLC layer processing unit 220 and a PDCP layer processing unit 230.

The transmission and reception unit 210 communicates with the user equipment 100 in dual connectivity. Specifically, the transmission and reception unit 210 transmits and receives various radio channels, such as uplink/downlink control channels and uplink/downlink data channels, to/from the user equipment 100.

The RLC layer processing unit 220 has an RLC layer 221 to communicate with the user equipment 100. In uplink communication in the split bearer, the RLC layer processing unit 220 assembles RLC SDUs from RLC PDUs received from the user equipment 100 via a lower layer and if the base station 200 serves as an anchor node in the split bearer, transmits the assembled RLC SDUs to its own PDCP layer processing unit 230. On the other hand, if the base station 200 does not serve as the anchor node in the split bearer, the base station 200 transmits the assembled RLC SDUs to the PDCP layer processing unit 230 in the anchor base station 200.

The PDCP layer processing unit 230 has a PDCP layer 231 to communicate with the user equipment 100. In uplink communication in the split bearer, if the base station 200 serves as the anchor node in the split bearer, the PDCP layer processing unit 230 reorders RLC SDUs received from its own RLC layer processing unit 220 and RLC SDUs received from the RLC layer processing unit 220 in a different base station 200, for which the split bearer is configured, to assemble PDCP SDUs and transmit them to an upper layer.

The PDCP layer processing unit 230 has an uplink reordering timer and when the transmission direction of uplink data packets is changed in the split bearer configured for the user equipment 100, activates the uplink reordering timer. If the sequence numbers of the uplink data packets received from the user equipment 100 is out of sequence, the PDCP layer processing unit 230 suspends transmitting the received uplink data packets to an upper layer.

In one embodiment, if the sequence numbers of the uplink data packets received from the user equipment 100 remain out of sequence by expiration of the uplink reordering timer, the PDCP layer processing unit 230 may transmit the received uplink data packets to the upper layer. Specifically, if the PDCP layer processing unit 230 has failed to receive a missing one of the uplink data packets from the user equipment 100 before expiration of the uplink reordering timer, the PDCP layer processing unit 230 abandons reception of the missing uplink data packet and transmits the uplink data packets waiting for reordering to the upper layer.

On the other hand, if the uplink data packet corresponding to the missing sequence number is received, the PDCP layer processing unit 230 stops the uplink reordering timer and transmits the received uplink data packet to the upper layer. Specifically, if the missing uplink data packet is received from the user equipment 100 before expiration of the uplink reordering timer, the PDCP layer processing unit 230 reorders the received uplink data packet and the uplink data packets waiting for reordering and transmits them to the upper layer.

For differences between the reordering timer and the uplink reordering timer as defined in the above-stated split bearer, the former is always used for reordering while the latter is used only at a certain timing, that is, a timing of changing the uplink transmission direction. In other words, upon detecting a missing sequence number for uplink data packets received after the uplink reordering timer has expired or stopped, the PDCP layer processing unit 230 determines that the uplink data packet corresponding to the missing sequence number has been discarded in the user equipment 100.

Note that the above-stated first and second embodiments may be used separately or in combination. For example, if the split bearer is applied, the first embodiment may be to downlink communication, and the second embodiment may be applied to uplink communication. Specifically, when the split bearer configured for the secondary base station 200B is deleted in the downlink communication, the user equipment 100 performs re-establishment on the s-RLC layer 122 for the secondary base station 200B and releases the split bearer after execution of the re-establishment. On the other hand, when the transmission direction of uplink data packets is changed in uplink communication in the split bearer configured for the master base station 200A and the secondary base station 200B, the user equipment 100 may perform the re-establishment on the m-RLC layer 121 for the master base station 200A, the s-RLC layer 122 for the secondary base station 200B and the PDCP layer 131.

Although the embodiments of the present invention have been described in detail, the present invention is not limited to the above-stated specific embodiments, and various modifications and variations can be made within the spirit of the present invention as recited in claims.

This international patent application claims the benefit of priority based on Japanese Priority Application No. 2014-160762 filed on Aug. 6, 2014, the entire contents of which are hereby incorporated by reference.

LIST OF REFERENCE SYMBOLS

10: radio communication system
100: user equipment
110, 210: transmission and reception unit
120, 220: RLC layer processing unit
130, 230: PDCP layer processing unit
200: base station

The invention claimed is:

1. A user equipment comprising:
a transceiver that communicates with a master base station among a plurality of master base stations and a secondary base station simultaneously in dual connectivity;
a processor that manages:
an RLC (Radio Link Control) layer for the master base station and an RLC layer for the secondary base station; and
a PDCP (Packet Data Convergence Protocol) layer transmitting and receiving data to/from the RLC layer for the master base station and the RLC layer for the secondary base station,
wherein when a transmission direction of uplink data packets is changed in response to handover between the master base stations being triggered in a split bearer for the master base station and the secondary base station, the processor performs:
re-establishment on the RLC layer for the master base station and the RLC layer for the secondary base station, and
re-establishment on the PDCP layer, and
wherein the processor performs the re-establishment on the RLC layers and the PDCP layer to:
stop transmitting uplink data packets that were distributed before a change in the transmission direction to the master base station, and
transmit, when the transmission direction of uplink data packets is changed, the uplink data packets that were distributed before the change in the transmission direction to a target base station associated with a post-changed transmission direction.

2. The user equipment as claimed in claim 1, wherein the processor performs the re-establishment on the RLC layers and the PDCP layer to transmit the transmission-stopped uplink data packets in sequence of sequence numbers.

3. The user equipment as claimed in claim 2, wherein when a re-establishment command is received from the target base station for a pre-changed transmission direction, the processor performs the re-establishment.

4. The user equipment as claimed in claim 2, wherein the re-establishment is performed on only uplink communication.

5. The user equipment as claimed in claim 1, wherein when a re-establishment command is received from a target base station for a pre-changed transmission direction, the processor performs the re-establishment.

6. The user equipment as claimed in claim 5, wherein the re-establishment is performed on only uplink communication.

7. The user equipment as claimed in claim 1, wherein the re-establishment is performed on only uplink communication.

8. A base station, comprising:
a transceiver that communicates with user equipment in dual connectivity;
a processor that manages:
an RLC (Radio Link Control) layer to communicate with the user equipment; and
a PDCP (Packet Data Convergence Protocol) layer to communicate with the user equipment,
wherein the processor further includes an uplink reordering timer, and when a transmission direction of uplink data packets is changed in a split bearer for the user equipment, the processor activates the uplink reordering timer and if sequence numbers of uplink data packets received from the user equipment are out of sequence, suspends transmitting the received uplink data packets to an upper layer.

9. The base station as claimed in claim 8, wherein if the sequence numbers of uplink data packets received from the user equipment remain out of sequence by expiration of the uplink reordering timer, the processor transmits the received uplink data packets to the upper layer.

10. The base station as claimed in claim 9, wherein if an uplink data packet corresponding to a missing sequence number is received, the processor stops the uplink reordering timer and transmits the received uplink data packet to the upper layer.

11. The base station as claimed in claim 9, wherein upon detecting a missing sequence number for uplink data packets received after the uplink reordering timer has expired or stopped, the processor determines that the uplink data packet corresponding to the missing sequence number has been discarded at the user equipment.

12. The base station as claimed in claim 8, wherein if an uplink data packet corresponding to a missing sequence number is received, the processor stops the uplink reordering timer and transmits the received uplink data packet to the upper layer.

13. The base station as claimed in claim 12, wherein upon detecting a missing sequence number for uplink data packets received after the uplink reordering timer has expired or stopped, the processor determines that the uplink data packet corresponding to the missing sequence number has been discarded at the user equipment.

14. The base station as claimed in claim 8, wherein upon detecting a missing sequence number for uplink data packets received after the uplink reordering timer has expired or stopped, the processor determines that the uplink data packet corresponding to the missing sequence number has been discarded at the user equipment.

\* \* \* \* \*